US012744262B2

(12) United States Patent
Hong et al.

(10) Patent No.: US 12,744,262 B2

(45) Date of Patent: Sep. 22, 2026

(54) METHOD FOR RECOVERING ACTIVE METALS FROM LITHIUM SECONDARY BATTERY

(71) Applicant: SK INNOVATION CO., LTD., Seoul (KR)

(72) Inventors: Suk Joon Hong, Daejeon (KR); Ji Min Kim, Daejeon (KR); Ji Yun Park, Daejeon (KR); Sung Real Son, Daejeon (KR)

(73) Assignee: SK INNOVATION CO., LTD., Seoul (KR)

(*) Notice: Subject to any disclaimer, the term of this patent is extended or adjusted under 35 U.S.C. 154(b) by 785 days.

(21) Appl. No.: 17/929,000

(22) PCT Filed: May 28, 2021

(86) PCT No.: PCT/KR2021/006646

§ 371 (c)(1),
(2) Date: Dec. 1, 2022

(87) PCT Pub. No.: WO2021/246721

PCT Pub. Date: Dec. 9, 2021

(65) Prior Publication Data

US 2023/0238599 A1 Jul. 27, 2023

(30) Foreign Application Priority Data

Jun. 1, 2020 (KR) ........................ 10-2020-0065753

(51) Int. Cl.
*H01M 10/54* (2006.01)
*C22B 1/24* (2006.01)
(Continued)

(52) U.S. Cl.
CPC ............... *H01M 10/54* (2013.01); *C22B 1/24* (2013.01); *C22B 5/12* (2013.01); *C22B 26/12* (2013.01)

(58) Field of Classification Search
CPC ............. H01M 10/54; H01M 10/0525; H01M 2220/30; C22B 1/24; C22B 5/12;
(Continued)

(56) References Cited

U.S. PATENT DOCUMENTS

2021/0028515 A1* 1/2021 Na ........................ H01M 4/364
2021/0115532 A1* 4/2021 La .......................... C01G 53/04
(Continued)

FOREIGN PATENT DOCUMENTS

CN 108539308 A 9/2018
DE 102016202458 A1 * 8/2017 ............ H01M 4/366
(Continued)

OTHER PUBLICATIONS

KR 102020238 B1 Trans (English Language Translation) (Year: 2019).*

(Continued)

*Primary Examiner* — Keith D. Hendricks
*Assistant Examiner* — Moriah S. Smoot
(74) *Attorney, Agent, or Firm* — The PL Law Group, PLLC

(57) ABSTRACT

In a method for recovering active metals from a lithium secondary battery according to exemplary embodiments, a cathode active material mixture including a lithium composite oxide may be reacted with a reducing reaction gas under a pressurized condition and washed with water. In this case, a large amount of the cathode active material mixture may be treated within a shortened process time, and the active metal may be recovered with high yield and high efficiency.

9 Claims, 3 Drawing Sheets

(51) Int. Cl.
*C22B 5/12* (2006.01)
*C22B 26/12* (2006.01)

(58) Field of Classification Search
CPC ......... C22B 26/12; C22B 7/002; C22B 7/005; C22B 7/006; C22B 23/043; Y02W 30/84
See application file for complete search history.

(56) References Cited

U.S. PATENT DOCUMENTS

| | | | | |
|---|---|---|---|---|
| 2021/0273274 | A1* | 9/2021 | Koo | C01D 15/08 |
| 2022/0349022 | A1* | 11/2022 | Son | C22B 7/001 |
| 2022/0395794 | A1* | 12/2022 | Son | B01J 8/44 |
| 2022/0407133 | A1* | 12/2022 | Son | C22B 26/12 |
| 2025/0207217 | A1* | 6/2025 | Son | C22B 5/14 |

FOREIGN PATENT DOCUMENTS

| | | | | | |
|---|---|---|---|---|---|
| JP | 2004011010 | A | * | 1/2004 | |
| JP | 2012229481 | A | * | 11/2012 | |
| KR | 10-2014-0126943 | A | | 11/2014 | |
| KR | 10-2015-0002963 | A | | 1/2015 | |
| KR | 10-1623930 | B1 | | 5/2016 | |
| KR | 101731213 | B1 | * | 4/2017 | H01M 4/587 |
| KR | 101897134 | B1 | * | 9/2018 | C01D 15/02 |
| KR | 10-2019-0065882 | A | | 6/2019 | |
| KR | 102020238 | B1 | * | 9/2019 | H01M 10/052 |
| WO | WO 2019/199015 | A1 | | 10/2019 | |

OTHER PUBLICATIONS

KR 101731213 B1 Trans (English Language Translation) (Year: 2017).*

DE 102016202458 A1 Trans (English Language Translation) (Year: 2017).*

KR 101897134 B1 Trans (English Language Translation) (Year: 2018).*

JP 2004011010 A Trans (English Language Translation) (Year: 2004).*

JP 2012229481 A Trans (English Language Translation) (Year: 2012).*

Meshram, Pratima, B. D. Pandey, and T. R. Mankhand. "Extraction of lithium from primary and secondary sources by pre-treatment, leaching and separation: A comprehensive review." Hydrometallurgy 150 (2014): 192-208. (Year: 2014).*

European Search Report For EP21818449.7 issued on Jun. 5, 2024 from European patent office in a counterpart European patent application.

Brian Makuza et al., "Pyrometallurgical options for recycling spent lithium-ion batteries: A comprehensive review", Journal of Power Sources, vol. 491, Apr. 1, 2021, p. 229622, XP093166418, Amsterdam, NL ISSN: 0378-7753, DOI: 10.1016/j.jpowsour.2021.229622.

Pengcheng Liu et al., "Recovering valuable metals from LiNixCoyMn1-x-yO2 cathode materials of spent lithium ion batteries via a combination of reduction roasting and stepwise leaching", Journal of Alloys and Compounds, vol. 783, Apr. 1, 2019, pp. 743-752, XP093165827, CH, ISSN: 0925-8388, DOI: 10.1016/j.jallcom.2018.12.226.

* cited by examiner

METHOD FOR RECOVERING ACTIVE METALS FROM LITHIUM SECONDARY BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2021/006646, filed May 28, 2021, which claims priority to the benefit of Korean Patent Application No. 10-2020-0065753 filed in the Korean Intellectual Property Office on Jun. 1, 2020, the entire contents of which are incorporated herein by reference.

BACKGROUND

1. Technical Field

The present invention relates to a method for recovering active metals from a lithium secondary battery, and more particularly, to a method for recovering lithium, and the like from a waste cathode of a lithium secondary battery.

2. Background Art

A secondary battery is a battery that can be repeatedly charged and discharged, and is widely applied to portable electronic communication devices such as camcorders, mobile phones, and laptop computers with the development of information communication and display industries.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

The lithium secondary battery may include an electrode assembly including a cathode, an anode, and a separation membrane (separator); and an electrolyte in which the electrode assembly is impregnated. The lithium secondary battery may further include, for example, a pouch-shaped outer case in which the electrode assembly and the electrolyte are housed.

As a cathode active material of the lithium secondary battery, a lithium composite oxide may be used. The lithium composite oxide may contain transition metal such as nickel, cobalt, manganese and the like.

The lithium composite oxide as the cathode active material may be prepared by reacting a lithium precursor with a nickel-cobalt-manganese (NCM) precursor containing nickel, cobalt and manganese.

As the above-described expensive valuable metals are used for the cathode active material, 20% or more of manufacturing costs of the lithium secondary battery is required to generate the cathode material.

Recently, as the environmental protection issue is emerging, research on a method for recovering a cathode active material is being conducted. In order to recycle the cathode active material, it is necessary to regenerate the lithium precursor from a waste cathode with high efficiency and high purity.

Conventionally, a method for sequentially recovering valuable metals by leaching a waste cathode active material in a strong acid such as sulfuric acid has been used, but the wet process is disadvantageous in terms of regeneration selectivity and regeneration time, and may cause environmental pollution.

For example, Korean Patent Laid-Open No. 2015-0002963 discloses a method for recovering lithium using a wet method. However, the above method recovers lithium by wet extraction from a waste liquid remaining after extracting cobalt, nickel, etc., such that the recovery rate of lithium is excessively reduced, and a large number of impurities may be generated from the waste liquid.

SUMMARY

It is an object of the present invention to provide a method for recovering active metals from a lithium secondary battery with high yield and high efficiency from a cathode active material mixture.

A method for recovering active metals from a lithium secondary battery, the method including: preparing a cathode active material mixture including a lithium composite oxide from a waste cathode of the lithium secondary battery; forming a preliminary precursor mixture by reacting the cathode active material mixture with a reducing reaction gas under a pressurized condition of 3 bar to 25 bar; and recovering a lithium precursor by performing water washing treatment on the preliminary precursor mixture.

In one embodiment, a reaction temperature with the reducing reaction gas may be 420° C. to 500° C.

In one embodiment, the step of reacting with the reducing reaction gas may include supplying the reducing reaction gas into a reactor in a reaction time of less than 1 hour at 5 to 50 mL/min/g of cathode active material mixture.

In one embodiment, the reaction with the reducing reaction gas may be performed in a fixed bed reactor or a fluidized bed reactor.

In one embodiment, the reducing reaction gas may include hydrogen and a carrier gas, and a concentration of the hydrogen in the reducing reaction gas may be 10 to 40 volume %.

In one embodiment, the carrier gas may include nitrogen or argon.

In one embodiment, the step of preparing of the cathode active material mixture may include dry pulverizing the waste cathode.

In one embodiment, the lithium composite oxide contains nickel (Ni), cobalt (Co) and manganese (Mn).

In one embodiment, the preliminary precursor mixture may include preliminary lithium precursor particles and transition metal-containing particles, and the transition metal-containing particles may include Ni-containing particles, Co-containing particles and Mn-containing particles.

In one embodiment, the method may further include precipitating the transition metal-containing particles through the water washing treatment.

In one embodiment, the method may further include recovering a transition metal precursor in a form of an acid salt by selectively treating the transition metal-containing particles with an acid solution.

According to exemplary embodiments, it is possible to recover the lithium precursor by reacting a cathode active material mixture obtained from a waste cathode of a lithium secondary battery with a reducing gas under a pressurized condition. In this case, a process time is reduced and a throughput per hour may be increased, such that the lithium precursor can be obtained with high yield and high efficiency.

According to exemplary embodiments, it is possible to recover the lithium precursor from a waste cathode active material through a dry-based process. In this case, unlike the wet-based process, the lithium precursor may be obtained with high purity without the need to perform an additional process.

DETAILED DESCRIPTION

Exemplary embodiments provide a method for recovering active metals from a lithium secondary battery, which includes reacting a cathode active material mixture including a lithium composite oxide with a reducing reaction gas under a pressurized condition; and washing the same with water. In this case, a large amount of the cathode active material mixture may be processed within a shortened process time, and the active metal may be recovered with high yield and high efficiency.

Hereinafter, exemplary embodiments of the present invention will be described in more detail with reference to the accompanying drawings. However, these embodiments are merely an example, and the present invention is not limited to the specific embodiments described as the example.

As used herein, the term "precursor" is used to comprehensively refer to a compound including specific metals to provide the specific metals included in the electrode active material.

Figure 1:
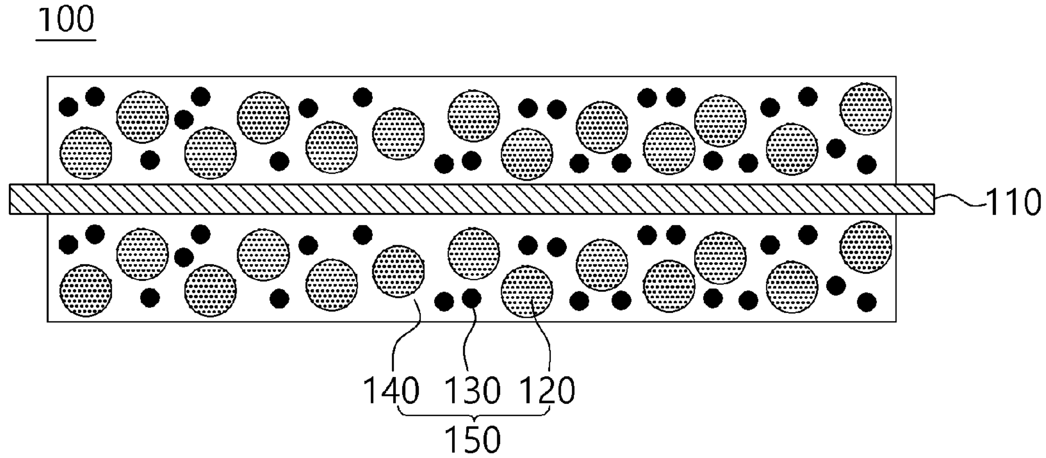
FIG. 1 is a schematic cross-sectional view for describing a cathode of a lithium secondary battery according to exemplary embodiments.
Figure 2:
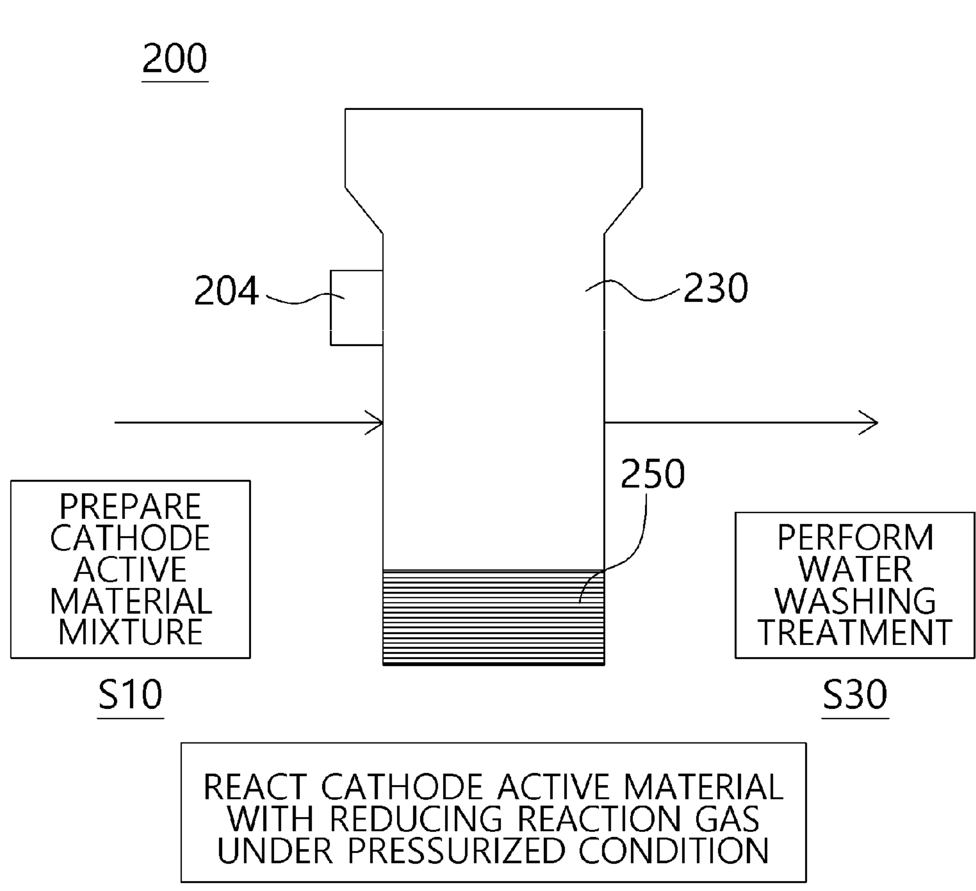
FIG. 2 is a schematic flowchart for describing a method for recovering active metals from a lithium secondary battery according to exemplary embodiments.

FIG. 1 is a schematic cross-sectional view for describing a cathode of a lithium secondary battery according to exemplary embodiments. In addition, FIG. 2 is a schematic flowchart for describing a method for recovering active metals from a lithium secondary battery according to exemplary embodiments. For the convenience of description, FIG. 2 shows a schematic view of a reactor together with the process flow. For example, FIG. 2 is a schematic flowchart for describing a method for recovering active metals from a lithium secondary battery using an exemplary fixed bed reactor.

The method for recovering active metals from a lithium secondary battery according to exemplary embodiments may include preparing a cathode active material mixture including a lithium composite oxide from a waste cathode of the lithium secondary battery (e.g., S10).

For example, the cathode active material mixture may be obtained from a waste lithium secondary battery. The waste lithium secondary battery includes a lithium secondary battery that cannot be substantially reused (charged/discharged), and may include, for example a lithium secondary battery whose charge/discharge efficiency is greatly reduced due to the end of its life-span, or a lithium secondary battery destroyed by an impact or chemical reaction.

As used herein, the term "cathode active material mixture" may refer to a raw material put into a reducing reaction treatment to be described below after a cathode current collector is substantially removed from the waste cathode. In addition, for example, the cathode active material mixture may substantially not include an anode material of a lithium secondary battery.

Referring to FIG. 1, a cathode 100 separated from the waste lithium secondary battery may include a cathode current collector 110 and a cathode active material layer 150 formed on the cathode current collector 110.

The cathode active material layer 150 may include a cathode active material 120 and a conductive material 130 dispersed in a binder 140.

The cathode current collector 110 may include, for example, a metal foil such as an aluminum foil. The binder may include, for example, a resin material such as vinylidene fluoride-hexafluoropropylene copolymer (PVDF-co-HFP), polyvinylidene fluoride (PVDF), polyacrylonitrile, polymethyl methacrylate or the like. The conductive material may include, for example, a carbon-based material such as graphite, carbon black, graphene, carbon nanotube or the like.

In one embodiment, PVDF may be used as the binder 140, and carbon black may be used as the conductive material 130.

In one embodiment, the cathode active material 120 included in the cathode active material layer 150 may include lithium and an oxide containing transition metals. The cathode active material mixture may include a lithium composite oxide.

In one embodiment, the lithium composite oxide may include at least one of lithium cobalt oxide (LiCoO2), lithium cobalt nickel manganese oxide (LiCoxNiyMnzO2, x+y+z=1), lithium cobalt nickel oxide (LiCoxNiyO2, x+y=1), lithium manganese oxide (LiMnO2), lithium manganese phosphate (LiMnPO4), lithium iron phosphate (LiFePO4), lithium nickel aluminum oxide (LiNixAlyO2, x+y=1) and lithium nickel cobalt aluminum oxide (LiNixCoyAlzO2), x+y+z=1).

In some embodiments, the lithium composite oxide may be an NCM-based lithium composite oxide including nickel, cobalt and manganese.

In some embodiments, the cathode active material may include a compound represented by Formula 1 below.

$$LixM1aM2bM3cOy \quad \text{[Formula 1]}$$

In Formula 1, M1, M2 and M3 may be any one selected from Ni, Co, Mn, Na, Mg, Ca, Ti, V, Cr, Cu, Zn, Ge, Sr, Ag, Ba, Zr, Nb, Mo, Al, Ga and B. In Formula 1, x, y, a, b and c may be in a range of $0<x\leq1.2$, $2\leq y\leq2.02$, $0<a<1$, $0<b<1$, $0<c<1$, $0<a+b+c\leq1$, respectively.

For example, the cathode active material 120 may be separated from the cathode current collector 110, the binder 140 and the conductive material 130 to be selectively recovered. For example, the lithium precursor may be regenerated from the cathode active material 120 recovered through a hydrogen reduction process to be described below.

When the cathode current collector 110 is not completely separated and then mixed in the lithium precursor regeneration process, for example, an aluminum-lithium (Al—Li) alloy may be generated in a high-temperature treatment process, thereby reducing a recovery rate of the lithium precursor. In addition, when the conductive material 130 and the binder 140 are not removed and then mixed in the lithium precursor regeneration process, lithium carbonate is generated, such that it may be difficult to generate a lithium precursor in a desired compound form (e.g., lithium hydroxide).

In one embodiment, the recovered waste cathode may be dry pulverized to generate a cathode active material mixture. For example, the cathode active material mixture may be prepared in a powder form. In this case, since the hydrogen reduction treatment is performed in a state in which the cathode current collector, the binder and the conductive material are substantially removed, an occurrence of impurities such as a Li—Al alloy compound and lithium carbonate, etc., or a side reaction may be suppressed to obtain a high purity lithium precursor.

For example, by preparing a cathode completely separated from the cathode current collector, performing heat treatment on the cathode, and pulverizing the heat-treated cathode, the cathode active material included in the cathode may be separated. However, the embodiments of the present invention may be applied with a method for not only generating a cathode active material mixture through the dry pulverization process, but also recovering a cathode active material through chemical solvent treatment. As described above, the cathode active material mixture may include a lithium-transition metal oxide powder, for example, may include an NCM-based lithium oxide powder (e.g., Li(NCM)O2).

In some embodiments, the recovered cathode may be subjected to heat treatment before the pulverization treatment. Accordingly, desorption of the cathode current collector may be facilitated during the pulverization treatment, and the binder and the conductive material may be effectively removed. The heat treatment temperature may be, for example, about 100 to 500° C., and preferably about 350 to 450° C. As the impurities are substantially removed within the above range, decomposition and damage of the lithium-transition metal oxide may be prevented.

In some embodiments, the cathode active material mixture may have an average particle diameter (D50) of 5 to 100 μm. Within the above range, a lithium-transition metal oxide such as Li(NCM)O2 to be recovered may be easily separated from the cathode current collector, the conductive material and the binder, which are included in the cathode active material mixture.

Through the above-described processes, a cathode current collector component such as aluminum may be substantially separated and removed from the cathode active material mixture. In addition, through the above-described process, it is possible to obtain a cathode active material mixture in which contents of the components derived from the conductive material and the binder are reduced or the conductive material and the binder are substantially removed.

For example, according to the above-described process, a cathode active material mixture including a lithium composite oxide may be prepared from the waste cathode of a lithium secondary battery (e.g., S10).

For example, the cathode active material mixture may be reacted with a reducing reaction gas under a pressurized condition (e.g., S20).

For example, a reaction of the cathode active material mixture with the reducing reaction gas may be performed in a fixed bed reactor or a fluidized bed reactor. However, the reactor type of the present invention is not necessarily limited thereto, and any reactor used in the art may be used.

In one embodiment, a fixed bed reactor 200 may include a reactor chamber 230, a loading stage 250 configured to load the cathode active material mixture into the reactor chamber 230, and a pressure controller 204 configured to control the pressure in the reactor chamber 230. In addition, the fixed bed reactor 200 may include a heating means such as a heater or may be formed integrally with the heating means.

For example, when using the fixed bed reactor 200, by loading the cathode active material mixture into the loading stage 250 and then injecting the reducing reaction gas, the preliminary precursor mixture may be formed. For example, it is possible to perform a fixed type reaction in which a cathode active material mixture is preloaded in a batch type reactor or a tubular reactor, and then a reducing reaction gas is supplied. Herein, the fixed bed reactor may include an inlet through which the reducing reaction gas and/or a carrier gas passes.

For example, when using the fixed bed reactor 200, reducing reactions of the cathode active material mixture and the reducing reaction gas may be performed under a higher pressure than that of the fluidized bed reactor, and a yield of the finally recovered active metal may be increased.

In one embodiment, the cathode active material mixture may be reacted with a reducing reaction gas under a pressurized condition of 3 bar to 25 bar to form a preliminary precursor mixture. Preferably, the preliminary precursor mixture may be formed under a pressurized condition of 5 bar to 21 bar. More preferably, the preliminary precursor mixture may be formed under a pressurized condition of 10 bar to 15 bar.

For example, within the above-described pressure range, the reaction of the cathode active material mixture with the reducing reaction gas may be facilitated. Accordingly, the reaction time may be further shortened and the process time may be reduced even when treating a cathode active material mixture having a low reactivity. In addition, it is possible to obtain the lithium precursor with high yield and high efficiency.

For example, when the pressure in the pressurized condition is less than 3 bar, the throughput per hour of the cathode active material mixture may be decreased, and the recovery rate of the lithium precursor may be reduced. In addition, when the pressure in the pressurized condition exceeds 25 bar, aggregation of the product may occur, thereby reducing the recovery rate of the lithium precursor and may cause an increase in process costs.

In one embodiment, the reaction of the cathode active material mixture with the reducing reaction gas may be performed at a temperature of 420° C. to 500° C.

When the reaction of the cathode active material mixture with the reducing reaction gas is performed at less than 420° C., the preliminary precursor mixture may not be substantially generated. As used herein, the expression "not be substantially generated" may mean that a target material is formed in an amount of 1 part by weight or less based on 100 parts by weight of the lithium composite oxide.

When the reaction of the cathode active material mixture with the reducing reaction gas is performed at a temperature higher than 500° C., the transition metals may be excessively reduced and metal agglomerates may be excessively generated. Accordingly, the metal agglomerates may be adhered to an inner wall of a reactor body to prevent the generation of preliminary precursor particles, and the recovery rate of the lithium precursor may be decreased.

In one embodiment, reacting with the reducing reaction gas may include supplying the reducing reaction gas into the reactor in a reaction time of less than 1 hour at 5 to 50 mL/min/g of cathode active material mixture. In this case, a high purity lithium precursor may be recovered for a short time.

In one embodiment, the reducing reaction gas may include hydrogen and a carrier gas. For example, the carrier gas may include an inert gas such as nitrogen or argon, but it is not limited thereto.

For example, as the carrier gas is supplied to the reactor, reactants and products in the reactor may be moved to an upper portion of the reactor, and cyclone formation through the carrier gas may be facilitated.

In some embodiments, the reducing reaction gas may not substantially include oxygen and carbon dioxide. Accordingly, it is possible to provide a method for regenerating lithium oxide (Li2O) or lithium hydroxide (LiOH) as a lithium precursor with high selectivity. Also, it is possible to suppress by-products from being formed, for example, the lithium carbonate from being formed due to a reaction of the carbon dioxide gas with the lithium component.

In one embodiment, a hydrogen concentration in the reducing reaction gas may be about 10 to 40 volume % (vol %). As described above, the reducing reaction gas may be a mixed gas of hydrogen and a carrier gas, and the hydrogen concentration may be indicated by a volume % of hydrogen in the total volume of the mixed gas. In this case, the reaction of the cathode active material mixture with the reducing reaction gas may be facilitated, and the hydrogen concentration may be designed in consideration of the process time and yield according to pressure and temperature conditions of the reactor.

In some embodiments, the preliminary precursor mixture may include preliminary lithium precursor particles and transition metal-containing particles.

For example, the lithium composite oxide may be reduced to generate preliminary lithium precursor particles (e.g., lithium oxide (LiO2) particles, etc.). In addition, transition metal-containing particles (e.g., transition metal particles and transition metal oxide particles) may generated together. For example, at least one of Ni, Co, Mn, NiO, CoO, and MnO may be generated together with lithium oxide particles by the reducing reaction.

For example, the transition metal component of the transition metal-containing particles may be derived from the lithium composite oxide. For example, the lithium composite oxide may form the transition metal-containing particles by the transition metal component which is separated in a reaction to be converted into lithium oxide.

For example, the reducing reaction may be performed at about 420 to 500° C. Within the above reaction temperature range, the reducing reaction is facilitated without causing re-aggregation and recombination of the preliminary lithium precursor particles and the transition metal-containing particles.

In one embodiment, the lithium precursor may be recovered by performing water washing treatment on the preliminary precursor mixture (e.g., step S30). For example, the lithium oxide particles in the preliminary precursor mixture may be separated and provided as a lithium precursor by the water washing treatment.

In one embodiment, by the washing treatment, at least a part of the lithium oxide particles may be dissolved in water to be converted into lithium hydroxide. For example, the lithium hydroxide is water-soluble, such that an aqueous lithium hydroxide solution may be generated. In this case, the lithium oxide particles may be selectively separated from the preliminary precursor mixture.

For example, the transition metal-containing particles may be precipitated through the water washing treatment. For example, components other than the lithium oxide particles in the preliminary precursor mixture may be precipitated at the bottom of the aqueous solution. For example, a transition metal-containing mixture including the transition metal-containing particles may be precipitated.

For example, the transition metal-containing mixture may be separated by filtration to obtain a lithium precursor including high purity lithium hydroxide. For example, the lithium precursor in the form of lithium hydroxide particles or lithium oxide particles may be recovered by separating the aqueous lithium hydroxide solution, then evaporating water, or crystallizing through recrystallization, fractional crystallization or the like.

In one embodiment, the transition metal precursor in the form of an acid salt may be recovered by selectively treating the precipitated, separated transition metal-containing particles with an acid solution. For example, sulfuric acid may be used as the acid solution. In this case, NiSO4, MnSO4 and CoSO4, etc. may be recovered as the transition metal precursor.

In some embodiments, the water washing treatment may be performed under conditions in which carbon dioxide (CO2) is excluded. For example, since the water washing treatment is performed in a CO2-free atmosphere (e.g., an air atmosphere from which CO2 is removed), regeneration of lithium carbonate may be prevented. For example, a CO2-free atmosphere may be created by purging (e.g., nitrogen purging) water provided during the water washing treatment using a CO2-deficient gas.

As described above, after collecting the lithium precursor through the dry process, the transition metal precursors are selectively extracted using the acid solution. Therefore, the purity and selectivity of each metal precursor is improved, and the load of the wet process is reduced, such that an increase in wastewater and by-products may be reduced.

Figure 3:
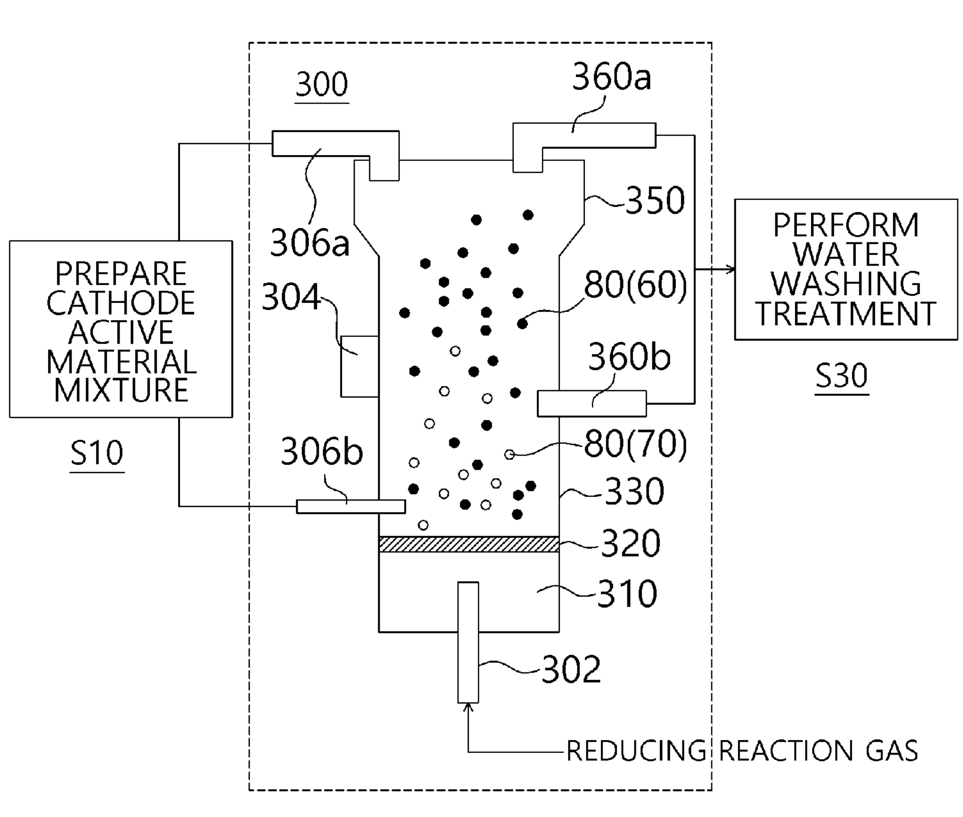
FIG. 3 is a schematic flow % chart for describing a method for recovering active metals from a lithium secondary battery according to some embodiments.

FIG. 3 is a schematic flowchart for describing a method for recovering active metals from a lithium secondary battery according to some exemplary embodiments. For the convenience of description, FIG. 3 shows a schematic view of the reactor together with the process flow. Steps and configurations which are substantially the same as or similar to those described with reference to FIG. 2 will not be described in detail.

Referring to FIG. 3, a fluidized bed reactor 300 may be divided into a reactor body 330, a reactor lower portion 310, and a reactor upper portion 350. The reactor body 330 may further include a pressure controller 304, and may include a heating means such as a heater or may be formed integrally with the heating means.

The cathode active material mixture (e.g., the waste cathode active material mixture) may be supplied into the reactor body 330 through supply passages 306*a* and 306*b*. The cathode active material mixture may be dropped through a first supply passage 306*a* connected to the reactor upper portion 350 or may be put into the reactor body 330 through a second supply passage 306*b* connected to the bottom thereof.

In one embodiment, the first and second supply passages 306*a* and 306*b* may be used together to supply the cathode active material mixture.

For example, a support 320 may be disposed between the reactor body 330 and the reactor lower portion 310, such that powders of the cathode active material mixture may be placed. The support 320 may include pores or injection holes through which a reducing reaction gas and/or a carrier gas to be described below passes.

The reducing reaction gas for converting the cathode active material mixture into a preliminary precursor may be supplied into the reactor body 330 through a reducing reaction gas passage 302 connected to the reactor lower portion 310. According to exemplary embodiments, the reducing reaction gas may include hydrogen ($H_2$) as a reaction source.

As the reducing reaction gas is supplied from the lower portion of the fluidized bed reactor 300 and comes into contact with the cathode active material mixture, the cathode active material mixture reacts with the reducing reaction gas while moving to the reactor upper portion 350 or staying in the reactor body 330 to be converted into the preliminary precursor.

When injecting the reducing reaction gas, a fluidized bed may be formed in the reactor body 330. Accordingly, the reducing reactor 300 may be a fluidized bed reactor. As the cathode active material mixture and the reducing reaction gas come into contact with each other in the fluidized bed and rise, stay, and fall repeatedly, the reaction contact time therebetween is increased and dispersion of particles is enhanced, such that a preliminary precursor mixture 80 having a uniform size may be obtained. For example, the preliminary precursor mixture may include preliminary lithium precursor particles 60 and transition metal-containing particles 70.

For example, the transition metal-containing particles 70 may include at least one of nickel, cobalt and manganese. For example, since the transition metal-containing particles 70 are relatively heavier than the preliminary lithium precursor particles 60, the preliminary lithium precursor particles 60 may first be collected through outlets **360*a* and 360*b***.

In one embodiment, the preliminary lithium precursor particles 60 may be discharged through a first outlet **360*a* connected to the reactor upper portion 350. In this case, selective recovery of the preliminary lithium precursor particles 60** according to the weight gradient may be facilitated.

In one embodiment, the preliminary precursor mixture 80 including the preliminary lithium precursor particles 60 and the transition metal-containing particles 70 may be collected through a second outlet **360*b* connected to the reactor body 330. In this case, the preliminary precursor mixture 80** may be directly recovered from a fluidized bed forming region to increase the yield.

In one embodiment, the preliminary precursor mixture 80 may be collected together through the first and second outlets **360*a* and 360*b***.

For example, the above-described water washing treatment may be performed on the preliminary lithium precursor mixture 80 recovered through the outlet 360.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

Example 1

After separating a cathode from a waste lithium secondary battery, a current collector in the cathode was removed to prepare a cathode active material mixture.

As the cathode, a cathode active material layer including the cathode active material of LiNi0.8Co0.1Mn0.1O2, Denka Black as a conductive material, and PVDF as a binder in a weight ratio of 92:5:3 was used.

1 kg of the cathode active material mixture was subjected to heat treatment at 450° C. for 1 hour. The heat-treated cathode active material mixture was cut into small units, and pulverized through milling to obtain a Li—Ni—Co—Mn oxide cathode active material sample.

10 g of the cathode active material sample was loaded in a fixed bed reactor, and a mixed gas of 25 vol % hydrogen (reaction gas) and 75 vol % nitrogen (carrier gas) was injected at a flow rate of 100 ml/min for 20 minutes. Internal temperature and pressure of the reactor were maintained at 450° C. and 21 bar, respectively.

After the reducing reaction, the sample was recovered, water was added 19 times the weight of the recovered sample, and the concentration of lithium dissolved in water was analyzed to measure the final recovery rate of lithium.

Example 2

The recovery rate of lithium was measured in the same manner as in Example 1, except that the hydrogen mixed gas was injected for 10 minutes.

Example 3

The recovery rate of lithium was measured in the same manner as in Example 1, except that the hydrogen mixed gas was injected for 5 minutes.

Example 4

The recovery rate of lithium was measured in the same manner as in Example 1, except that the internal pressure of the reactor was maintained at 10 bar.

Example 5

The recovery rate of lithium was measured in the same manner as in Example 4, except that the hydrogen mixed gas was injected for 10 minutes.

Example 6

The recovery rate of lithium was measured in the same manner as in Example 1, except that the internal pressure of the reactor was maintained at 24 bar.

Example 7

The recovery rate of lithium was measured in the same manner as in Example 1, except that the internal pressure of the reactor was maintained at 15 bar.

Example 8

The recovery rate of lithium was measured in the same manner as in Example 1, except that the internal pressure of the reactor was maintained at 5 bar.

Example 9

The recovery rate of lithium was measured in the same manner as in Example 1, except that the internal pressure of the reactor was maintained at 3 bar.

Example 10

20 g of the cathode active material sample was put into a fluidized bed reactor, and a mixed gas of 15 vol % hydrogen (reaction gas) and 85 vol % nitrogen (carrier gas) was injected from the bottom of the reactor at a flow rate of 400 ml/min for 40 minutes. The internal temperature and pressure of the reactor was maintained at 450° C. and 5 bar, respectively.

The recovery rate of lithium was measured in the same manner as in Example 1, except for the above-described contents.

Example 11

The recovery rate of lithium was measured in the same manner as in Example 1, except that a mixed gas of 25 vol % oxygen and 75 vol % nitrogen was injected at a flow rate of 100 ml/min for 20 minutes.

Example 12

The recovery rate of lithium was measured in the same manner as in Example 1, except that a mixed gas of 25 vol % carbon dioxide and 75 vol % nitrogen was injected at a flow rate of 100 ml/min for 20 minutes.

Example 13

The recovery rate of lithium was measured in the same manner as in Example 1, except that a mixed gas of 75 vol % oxygen and 25 vol % carbon dioxide was injected at a flow rate of 100 ml/min for 20 minutes.

Comparative Example 1

The recovery rate of lithium was measured in the same manner as in Example 1, except that the internal pressure of the reactor was maintained at 1 bar and the hydrogen mixed gas was injected for 30 minutes.

Comparative Example 2

The recovery rate of lithium was measured in the same manner as in Comparative Example 1, except that the hydrogen mixed gas was injected for 120 minutes.

Comparative Example 3

The recovery rate of lithium was measured in the same manner as in Comparative Example 1, except that the hydrogen mixed gas was injected for 180 minutes.

Comparative Example 4

The recovery rate of lithium was measured in the same manner as in Comparative Example 1, except that the hydrogen mixed gas was injected for 260 minutes.

Comparative Example 5

The recovery rate of lithium was measured in the same manner as in Example 10, except that the internal pressure of the reactor was maintained at 1 bar and the hydrogen mixed gas was injected for 60 minutes.

Comparative Example 6

The recovery rate of lithium was measured in the same manner as in Comparative Example 5, except that the hydrogen mixed gas was injected for 240 minutes.

Comparative Example 7

The recovery rate of lithium was measured in the same manner as in Example 1, except that the internal pressure of the reactor was maintained at 26 bar.

Experimental results of the examples and comparative examples are shown in Table 1 below.

TABLE 1

| | Reactor type | Reaction gas | Pressure (bar) | Time (min) | Recovery rate of lithium (%) |
|---|---|---|---|---|---|
| Example 1 | Fixed bed | Hydrogen | 21 | 20 | 98 |
| Example 2 | Fixed bed | Hydrogen | 21 | 10 | 78 |
| Example 3 | Fixed bed | Hydrogen | 21 | 5 | 69 |
| Example 4 | Fixed bed | Hydrogen | 10 | 20 | 81 |
| Example 5 | Fixed bed | Hydrogen | 10 | 10 | 50 |
| Example 6 | Fixed bed | Hydrogen | 24 | 20 | 98 |
| Example 7 | Fixed bed | Hydrogen | 15 | 20 | 90 |
| Example 8 | Fixed bed | Hydrogen | 5 | 20 | 54 |
| Example 9 | Fixed bed | Hydrogen | 3 | 20 | 35 |
| Example 10 | Fluidized bed | Hydrogen | 5 | 40 | 72 |
| Example 11 | Fixed bed | Oxygen | 21 | 20 | 7 |
| Example 12 | Fixed bed | Carbon dioxide | 21 | 20 | 18 |
| Example 13 | Fixed bed | Oxygen + carbon dioxide | 21 | 20 | 16 |
| Comparative Example 1 | Fixed bed | Hydrogen | 1 | 30 | 9 |
| Comparative Example 2 | Fixed bed | Hydrogen | 1 | 120 | 50 |
| Comparative Example 3 | Fixed bed | Hydrogen | 1 | 180 | 70 |
| Comparative Example 4 | Fixed bed | Hydrogen | 1 | 260 | 95 |
| Comparative Example 5 | Fluidized bed | Hydrogen | 1 | 60 | 34 |
| Comparative Example 6 | Fluidized bed | Hydrogen | 1 | 240 | 73 |
| Comparative Example 7 | Fixed bed | Hydrogen | 26 | 20 | 88 |

Referring to Table 1, when the reaction conditions were adjusted within the range according to the above-described exemplary embodiments of the present invention, a significantly higher recovery rate of lithium in the examples than in the comparative examples was obtained, respectively.

What is claimed is:

1. A method for recovering an active metal from a lithium secondary battery, the method comprising:

removing a cathode current collector from a waste cathode and obtaining a cathode active material mixture including a lithium composite oxide;

forming a preliminary precursor mixture by reacting the cathode active material mixture with a reducing reaction gas under a pressurized condition of 3 to 24 bar, wherein a reaction with the reducing reaction gas is performed at a temperature in a range of 420° C. to 500° C. for less than one hour, and the reducing reaction gas includes hydrogen and a carrier gas, and a concentration of the hydrogen in the reducing reaction gas is 10 to 40 volume %; and recovering a lithium precursor by performing water washing treatment on the preliminary precursor mixture.

2. The method according to claim 1, wherein the step of reacting with the reducing reaction gas comprises supplying the reducing reaction gas into a reactor at 5 to 50 mL/min per gram of the cathode active material mixture.

3. The method according to claim 1, wherein the reaction with the reducing reaction gas is performed in a fixed bed reactor or a fluidized bed reactor.

4. The method according to claim 1, wherein the carrier gas includes nitrogen or argon.

5. The method according to claim 1, wherein the step of obtaining of the cathode active material mixture comprises dry pulverizing the waste cathode.

6. The method according to claim 1, wherein the lithium composite oxide contains nickel (Ni), cobalt (Co) and manganese (Mn).

7. The method according to claim 5, wherein the preliminary precursor mixture comprises preliminary lithium precursor particles and transition metal-containing particles, and the transition metal-containing particles include Ni-containing particles, Co-containing particles and Mn-containing particles.

8. The method according to claim 7, further comprising precipitating the transition metal-containing particles through the water washing treatment.

9. The method according to claim 7, further comprising recovering a transition metal precursor in a form of an acid salt by treating the transition metal-containing particles with an acid solution.

* * * * *